United States Patent [19]

Loomer

[11] Patent Number: 4,458,808

[45] Date of Patent: Jul. 10, 1984

[54] SHUTTLE TABLE DRIVE MECHANISM

[76] Inventor: Weston R. Loomer, 170 Frogtown Rd., Union, Ky. 41091

[21] Appl. No.: 267,036

[22] Filed: May 26, 1981

[51] Int. Cl.³ ............................................ B65G 25/00

[52] U.S. Cl. .................................... 198/750; 414/749

[58] Field of Search ........................ 198/574, 750, 748; 414/718, 749, 662, 663, 282; 474/201, 244, 245, 474/246, 218, 219, 224, 225; 212/267, 269, 230, 264, 212/268; 74/89.2, 89.21

[56] References Cited

U.S. PATENT DOCUMENTS

| | | | |
|---|---|---|---|
| 1,665,808 | 4/1928 | Dow | 474/218 |
| 2,817,447 | 12/1957 | Bianca | 414/663 |
| 3,307,713 | 3/1967 | Bopp | 212/268 |
| 3,848,754 | 11/1974 | Bryntse | 414/749 |
| 3,892,324 | 7/1975 | Faletti | 414/749 |
| 4,156,331 | 5/1979 | Lester et al. | 212/268 |

FOREIGN PATENT DOCUMENTS

| | | | |
|---|---|---|---|
| 2431445 | 7/1978 | France | 198/750 |

*Primary Examiner*—Robert J. Spar
*Assistant Examiner*—Jonathan D. Holmes

[57] ABSTRACT

A shuttle table utilizing a plurality of interleaved overlapping chain strands includes a fixed frame, a longitudinally extending intermediate stage coupled to the fixed frame and a longitudinally extending, load carrying, upper table slidingly coupled to the intermediate stage. A pair of sprocket assemblies are attached to the fixed frame, one near each of the opposite ends of the intermediate stage. The drive chain mechanism includes 2N+1 chain strands coupled between the frame and the intermediate stage. One end of each of N+1 of the chain strands is connected near one end of the intermediate stage and one end of the remaining N chain strands is connected near the opposite end of the intermediate stage. Each of the N+1 and N chain strands is positioned about the distant sprocket assembly and the remaining ends of the N+1 chain strands and the N chain strands are connected together by a coupler or transition stage. The transition stage is formed by the interleaved overlapping of the N and N+1 chain strands, whereby each of the strands is maintained parallel to one another and to the longitudinal center-line of the intermediate stage.

14 Claims, 4 Drawing Figures

SHUTTLE TABLE DRIVE MECHANISM

BACKGROUND OF THE INVENTION

This invention relates to movable load carrying mechanisms such as shuttle tables and more particularly to a drive arrangement for such a load carrying mechanism.

Shuttle tables known in the art, which tables are frequently used in automated storage and retrieval systems, often utilize chains coupled between a stationary frame and a movable table surface to transmit power between a source and the movable table surface. Although conventional chain linkages are generally satisfactory when the tables are used to carry relatively light loads, these chain structures have proved to be generally unsatisfactory when called upon to handle heavy loads. This is due primarily to the fact that these chains must be offset or canted as they are wrapped about the sprockets or sheave nests located adjacent the forward and rearward ends of the table and this offset places substantial stress on the chains causing relatively high rates of wear. Additionally, as the loads carried by the shuttle table are increased, the thickness or weight of the chains utilized to drive the table must, of course, be increased. This in turn necessitates the use of greater offsets and these greater offsets result in even higher rates of wear. Further, because the locations at which the chains are connected at each longitudinal end of the table are not symmetrical relative to the longitudinal center-line of the table, skewing forces are applied to the table when it is driven. It will be readily understood of course that rapid chain wear is undesirable for reasons beyong the mere cost of the chain which must be replaced. Since the table is inoperable during the period of chain replacement, the warehouse section served by the particular table is also out of service during this period and it is this effect of rapid chain wear which results in the greatest cost and is the most unacceptable. Additionally, the aforementioned skewing forces cause problems in accurately positioning the table and cause misalignment of the table, so that, even if the table is operable, its utility is decreased and may even be of virtually no value.

SUMMARY OF THE INVENTION

It is therefore an object of the invention to provide a coupling structure for a multi-strand drive chain arrangement whereby the aforesaid drawbacks and disadvantages may be most efficaciously avoided.

It is another object of this invention to provide a drive mechanism utilizing conventional chain means arranged in a novel configuration.

It is a further object of this invention to provide such a drive mechanism utilizing chain means in which the individual chain strands are not canted or offset.

It is yet another object of the instant invention to provide a shuttle table drive mechanism which does not undergo as much wear as conventional chain drive mechanisms.

It is a still further object of this invention to provide a shuttle table drive mechanism in which skewing forces are not applied to the table during operation.

It is a yet further object of this invention to provide a shuttle table drive mechanism which does not cause misalignment of the table.

It is still another object of this invention to provide a shuttle table drive mechanism which can accurately position the table.

It is another object of this invention to provide a shuttle table drive mechanism utilizing a multi-strand drive chain in which the strands are connected at each longitudinal end of the table in a symmetrical pattern relative to the longitudinal center-line of the table.

Generally speaking, the objectives of the instant invention are attained by the provision of a chain strand coupler comprising first chain means including N strands of chain, where N is at least one, each strand having first and second ends, second chain means including N+1 strands of chain, each strand having first and second ends, wherein said N+1 strands of chain and said N strands of chain are connected together in a transition stage, said transition stage being formed by the interleaved overlapping of said N and N+1 chain strands and at least one pin extending transversely through each strand of said 2N+1 chain strands thereby maintaining each of said strands of chain longitudinally stationary relative to one another.

The objectives of the present invention are also attained by the provision of a table drive mechanism comprising a fixed frame, a longitudinally extending member having first and second spaced ends arranged for linear movement in a first plane, and 2N+1 chain strands coupled between said frame and said member, one end of N+1 chain strands being connected proximate the first end of said member and one end of the other N chain strands being connected proximate the second end of said member, the remaining ends of said N+1 chain strands and said N chain strands being connected together, each of said 2N+1 chain strands extending parallel to one another.

The objectives of the present invention are also attained by the provision of a shuttle table drive mechanism comprising a fixed frame, a longitudinally extending intermediate stage having first and second spaced ends movingly coupled to said fixed frame and arranged for linear movement in a first plane, a longitudinally extending upper table having first and second spaced ends movingly coupled to said intermediate stage and arranged for linear movement in a second plane parallel to said first plane, and 2N+1 drive chain strands coupled between said frame and said intermediate stage, one end of N+1 drive chain strands being connected proximate the first end of said intermedite stage and one end of the other N drive chain strands being connected proximate the second end of said intermediate stage, the remaining ends of said N+1 drive chain strands and said N drive chain strands being connected together, each of said 2N+1 drive chain strands extending parallel to one another.

The foregoing and other objects and features of the present invention will be more clearly understood from the following detailed description thereof, when read in conjunction with the accompanying drawings, in which.

DESCRIPTION OF THE PREFERRED EMBODIMENT

Figure 1:
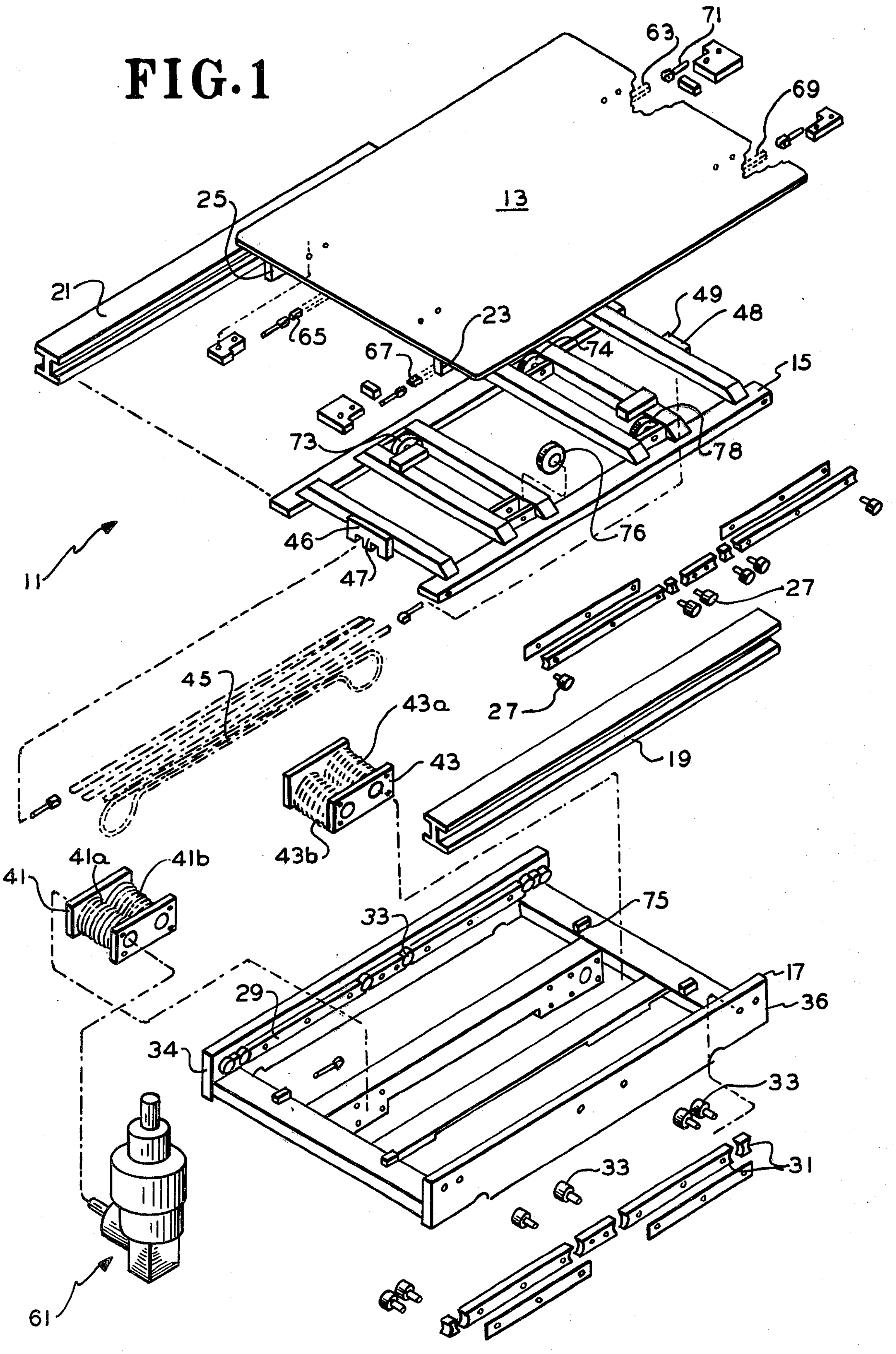
FIG. 1 is an exploded perspective of a shuttle table utilizing the invention.

Turning now to FIG. 1, there is illustrated an exploded perspective of the subject shuttle table indicated generally at 11. The table includes a movable, load carrying, upper table indicated at 13, a movable intermediate stage indicated at 15 and a stationary frame, indicated at 17. The upper table 13 is movingly supported by the intermediate stage 15 in any conventional manner. In the embodiment illustrated in FIG. 1, a pair of grooved or slotted guide rails, indicated at 19 and 21 are attached to the intermediate stage 15. A pair of roller support members, indicated at 23 and 25, are attached in any conventional manner to the upper table 13 and a plurality of guide rollers, indicated at 27, are arranged to ride in the grooves of the guide rails 19 and 21 which may be made of metal. The roller support members 23 and 25 may be made of, for example, a metal, as are the guide wheels 27, resulting in a low friction rolling relationship between the upper table member 13 and the intermediate stage 15.

As indicated above, the intermediate stage 15 is also movable and this stage is movable relative to the stationary frame 17 as well as movable relative to the table 13. The stage 15 may be constructed so as to be movable relative to the frame 17 in any conventional manner. In the embodiment of FIG. 1, the frame 17 is provided with selected plurality of rollers, indicated at 33, which are attached to a pair of side members 34 and 36. Disposed between the rollers are a plurality of longitudinally extending members or wear strips indicated at 29 and 31 which may be made, for example, of a high density polyethylene, and which are attached, by any suitable means, to the frame 17. The rollers 33 provide a low friction contact surface upon which the intermediate stage 15 may roll londitudinally.

Attached by any conventional means to the frame 17 are two drive and idler sprocket assemblies, indicated at 41 and 43, one being attached at one longitudinal end of the frame 17 and the other attached to the frame at the opposite end thereof. Extending about the sprocket assemblies 41 and 43 are a plurality of conventional roller chain strands (to be described in greater detail below), the total chain structure, which funtions as the drive chain, being indicated at 45. One end of the chain 45 is connected, by means of a slotted bracket 46 and a bolt to one end of the stage 15 at an end 47 thereof and the other end of the chain 45 is connected to the opposite end 48 of the stage 15 by means of a slotted bracket 49 and a bolt. The location of the connection points of the chain 45 relative to the stage 15 and the function of the slotted brackets 46 and 49 will be more fully discussed below. The drive chain 45 is wrapped about the drive sprockets indicated at 41*a* and 43*a* and over the idler sprockets 41*b* and 43*b*. Coupled to one of the sprocket assemblies 41 and 43 in any conventional manner (for example, by a shaft) is a drive motor indicated at 61.

Connected between the upper table 13 and the frame 17 are four conventional leaf type chains, which function as table control chains, indicated at 63, 65, 67 and 69. Thus, for example, the control chain 63 is connected in any conventional manner to the upper table 13 by an anchor, indicated at 71. The chain 63 is guided about an idler roller, indicated at 73, which is rotatably mounted on the intermediate stage 15 near the end 47 thereof and the chain 63 is connected to the frame 17 by any suitable means, for example, by means of an anchor 75. The other three lengths of control chain, 65, 67, and 69, are coupled between the table 13 and the frame 17 by anchors and via idler rollers in a similar manner, two chains being disposed near each end of the upper table 13, as illustrated in FIG. 2, thus providing bi-directional control of the table 13.

Figure 2:
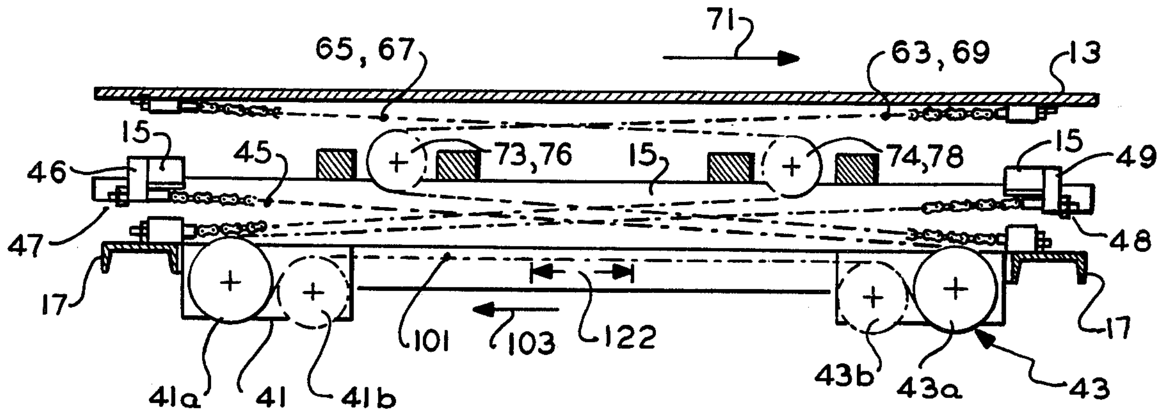
FIG. 2 is a schematic elevation of the shuttle table illustrating the operation of the chain drive mechanism of the invention.

Turning now to FIG. 2, which is a schematic elevation view of a shuttle table structure, including table 13, the intermediate stage 15, the frame 17, the chain 45 and the chains 63–69, the operation of the shuttle table will now be described. As indicated above, the drive chain 45 may be driven by a motor coupled to the drive sprocket 41*a*. As the sprocket 41*a* is rotated in, for example, a clockwise direction as viewed in FIG. 2, the intermediate stage will be moved in the direction indicated by the arrow 71. It will be understood, of course, that the distance traveled by the intermediate stage 15 is equal to the distance traveled by any point on the chain 45. The rotation of the drive sprocket 41*a* also, of course, causes the movement of the upper table 13, and it does so through the mechanism of the previously described control chains 63, 65, 67 and 69. In this instance, however, the distance traveled by the drive chain 45 is translated into a distance traveled by the upper table 13 which is twice as great and thus it will be understood that the distance traveled by the upper table 13 is twice as great as that traveled by the intermediate stage 15. For example, if the drive sprocket 41*a* is rotated in a clockwise direction so that the point on the chain indicated at 101 moves a distance "X" in the direction of the arrow 103, then the intermediate stage will also move a distance X in the direction indicated by the arrow 71. The movement of the intermediate stage by the distance X will result in the lengthening of that portion of the chains 65 and 67 located between the idler rollers 74 and 78 and the frame 17 by an amount X. Therefore, that portion of the chains 65 and 67 located between the upper table 13 and the idler rollers 74 and 78 will be shortened by an amount X. It will be understood, however, that because the last discussed portion of the chains 65 and 67 have been shortened by an amount X while the idler rollers 74 and 78, which are attached to the intermediate stage 15, have simultaneously moved a distance X in the direction of the arrow 71, the upper table 13 must move a distance 2X in the direction of the arrow 71. It will also now become clear that the instant drive structure, which is completely contained within the longitudinally extending framework of the intermediate stage 15 (as illustrated in FIG. 2), is one which is capable of longitudinally driving the intermediate stage more than one-half of its longitudinal length. That is, either of the longitudinal ends 47 or 48 of the intermediate stage 15 can be driven beyond the location of the mid-point of the stage when it is centered.

Figure 3:
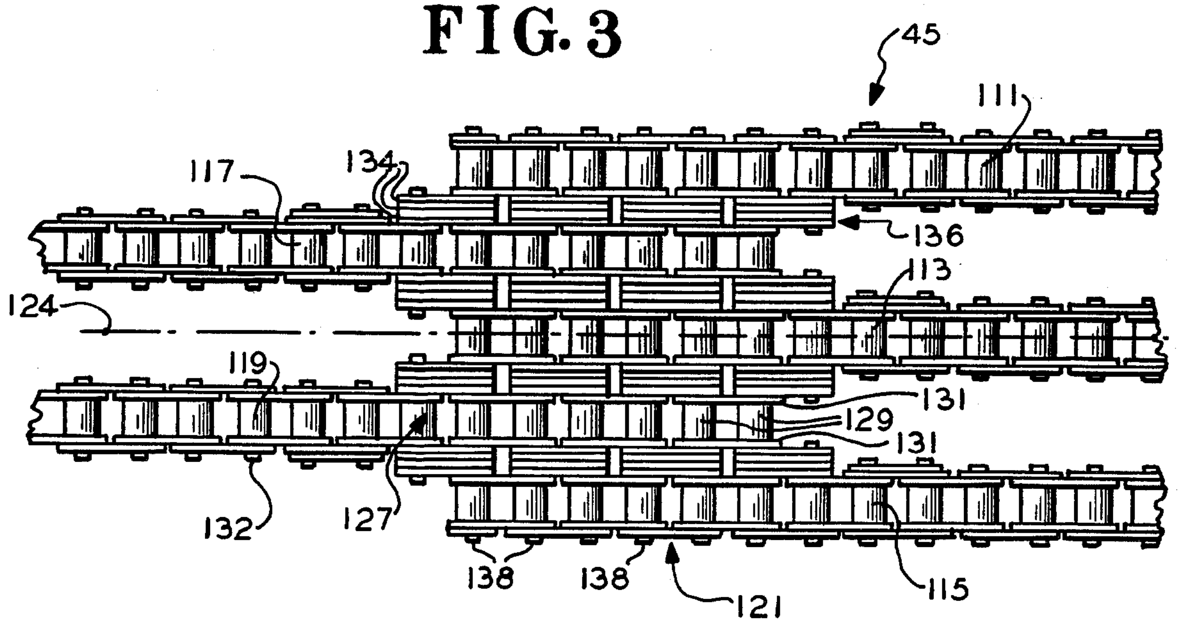
FIG. 3 is a detailed plan view of the inventive drive chain arrangement.

Turning now to FIG. 3, the novel structure of the drive chain 45 will be described in detail. As noted previously, chain drives for shuttle tables conventionally take the form of a single chain coupled at its two ends to the intermediate stage, the chain being routed about a pair of sprocket assemblies coupled to the frame, which results, due to the chain offset necessitated by such configuration, in relatively rapid chain wear. The chain structure 45 illustrated in FIG. 3, however, does not suffer from this defect. In point of fact, this chain is composed of five separate strands or lengths of chain, indicated at 111, 113, 115, 117 and 119 which are coupled together at a transition stage, indicated at 121, and none of the five separate strands or lengths of chain is forced to undergo any horizontal offset at all.

In more fully describing the structure of the chain 45 it should be noted that the five strands of chain are conveniently each made of equal length so that the transition stage is located, when the upper table 13 is centered relative to the intermediate stage, generally in the vicinity of the zone 122. Three of the chains, for example, the chains 111, 113, and 115, may be attached to the intermediate stage 15 at the end 47 thereof and these chains will extend about the sprocket assembly 43 and terminate in the zone 122 (FIG. 2) near the end thereof nearest the sprocket assembly 41. Two of the chains, for example the chains 117 and 119, are attached to the intermediate stage 15 at the end 48 thereof. These chains extend about the sprocket assembly 41 and terminate within the zone 122 at the end thereof nearest the sprocket assembly 43. The individual strands of the three chain and two chain lengths alternate, i.e. are interleaved, in the area of the transition stage 121 and are connected together by various spacers and pins.

It is here appropriate to note that, as indicated above, the chain strands are attached to the intermediate stage 15 in such a manner that no skewing forces are applied to the stage 15 when it is driven. As illustrated most clearly in FIG. 3, the chain 45 is arranged symmetrically about the longitudinally extending center-line of the stage 15, which center-line is indicated at 124. Thus, the strands 111, 113 and 115 are attached to the end 47 of the stage 15 so that the strand 113 is centered on the center-line 124 and the strands 111 and 115 are symmetrically disposed about opposite sides of the center-line 124. In a similar manner, the strands 117 and 119 are so connected at the end 48 of the stage 15 that neither strand is positioned on the center-line 124. Rather, the two strands are symmetrically disposed about the center-line. It will thus be understood that when the chain 45 is being driven (in either direction), the force applied to the stage 15 will be solely in a longitudinal direction, i.e., parallel to the center-line 124 of the stage 15.

Figure 4:
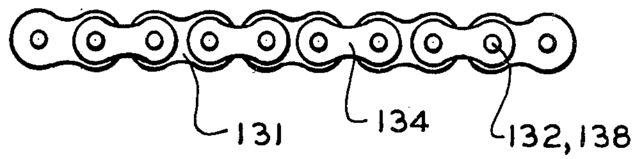
FIG. 4 is a detailed elevation of a portion of the chain arrangement illustrated in FIG. 3.

As illustrated in FIGS. 3 and 4, and as well known in the art, each pitch of roller link, indicated at 127, includes a pair of rollers 129 positioned between a pair of link plates 131. Extending through the rollers 129 and into the link plates 131 are press fit bushings (not shown) holding the roller link components together. Outside the transition stage 121 each strand includes roller link, connecting link plates (where required) and pin link plates. In this portion of each strand of chain, pins, which are indicated at 132 and which are relatively short (which short pins may be riveted), extend through the roller link bushings and hold the chain components together. Positioned between the chain strands (in the transition stage 121) and providing transverse separation between the strands are spacers, which in FIG. 3 are a plurality of link plates, each indicated at 134. The number of link plates provided is dependent on the desired separation between chain strands. This, in turn depends on the extent to which the pins 132 extend transversely beyond the roller links 127 and the amount of clearance desired between such pins 132. Thus, links of chain strand 111 must pass the links of chain strand 117 and the link plates indicated at 136 provide the required spacing. Of course, the spacers could be solid rather than composed of a plurality of link plates as illustrated in FIG. 3.

As previously noted, outside of the transition stage 121 the short pins 132 are used to connect the component parts of the chain strands together. It will be understood, of course, that in the transition stage 121 the relatively short pins 132 are not used to connect the various roller links and spacer plates together. Rather, in the transition stage 121 which, as previously noted, includes all five strands of chain, long pins (which may also be riveted), indicated at 138, are used to connect the components to one another.

It has been found that these long pins 138 serve to provide a desired distribution of forces between the two chain and three chain strands in the transition stage 121.

The reason that the brackets 46 and 49 (referred to above) are slotted will now, in light of FIGS. 2 and 3 and the foregoing discussion, be readily understood. It will be seen that as the intermediate stage 15 moves in the direction of the arrow 71 the two chain strand section and the bracket 49 to which it is attached must pass over the three chain strand section attached to the bracket 46. The bracket 49 is therefore advantageously formed, as shown, with a single slot through which the center chain of the three chain group will pass (the outer chains of the three chain group passing one to either side of the bracket 49) or with three slots, one for each chain of the three chain group. Similarly, the bracket 46 is formed with two slots, one for each chain of the two chain group so that the bracket 46 may pass these latter chains when the intermediate stage moves in a direction opposite to that indicated by the arrow 71.

It is appropriate to note at this point that the length of the transition stage can be varied depending on the strength of the structure desired. Theoretically, of course, the stage could be an overlap only a single link in length, although of course an overlap of a number of links will substantially increase the strength of the structure. On the other hand, it is desirable not to make the transition stage so long that it interferes with the ends of the intermediate stage 15 as the transition stage 121 is moved around and over a sprocket assembly as the intermediate stage is moved.

It is here appropriate to point out that although a three chain strand to two chain strand transition has here been illustrated, the concept here disclosed could just as easily be applied to a four chain strand to three chain strand transition or to a two chain strand to one chain strand transition, the only requirement being that one portion of the chain contains N strands and the other portion of the chain contains N+1 strands.

It will be understood that the foregoing description of the preferred embodiment of the present invention is for purposes of illustration only and that various structural and operational features as herein disclosed are susceptible to a number of modifications and changes, none of which entail any departure from the spirit and scope of the present invention is defined in the hereto appended claims.

I claim:

1. A movable surface drive chain arrangement comprising:

a fixed frame;

a longitudinally extending member, located adjacent to said frame, having first and second spaced ends and arranged for linear movement in a first plane;

first and second sprocket means, said first sprocket means fixed to said frame proximate the first end of said longitudinally extending member and said second sprocket means fixed to said frame proximate the second end of said longitudinally extending member; and 2N+1 chain strands coupled between said frame and said member, one end of N+1 of said 2N+1 chain strands being connected proximate the first end of said member and extending about said second sprocket means and one end of the remaining N of said 2N+1 chain strands being connected proximate the second end of said member and extending about said first sprocket means, the remaining ends of said N+1 and N chain strands being interleaved and connected together, each of said 2N+1 chain strands extending parallel to one another and to the longitudinal center-line of said longitudinally extending member.

2. A movable surface drive chain arrangement according to claim 1 further comprising drive means coupled to one of said sprocket means for driving said sprocket means whereby activation of said drive means causes said linear movement of said longitudinally extending member.

3. A movable surface drive chain arrangement according to claim 1 wherein said longitudinally extending member has a longitudinally extending center-line, said N chain strands being disposed symmetrically about said longitudinally extending center-line and said N+1 chain strands being disposed symmetrically about said longitudinally extending center-line.

4. A movable surface drive chain arrangement according to claim 1 wherein said N+1 strands of chain and said N strands of chain are connected together in a transition stage, said transition stage being formed by the interleaved overlapping of said N and N+1 chain strands and at least one pin extending transversely through each strand of said 2N+1 chain strands, thereby maintaining each of said strands longitudinally stationary relative to one another.

5. A movable surface drive chain arrangement according to claim 4 wherein said transition stage further comprises a plurality of spacing members, at least one spacing member positioned between each adjacent pair of interleaved overlapping adjacent strands.

6. A movable surface drive chain arrangement according to claim 5 wherein said pins extend through said spacing members thereby maintaining said spacing members longitudinally fixed relative to one another and to said chain strands.

7. A shuttle table mechanism comprising:

a fixed frame;

a longitudinally extending intermediate stage having first and second spaced ends movably coupled to said fixed frame and arranged for linear movement in a first plane;

a longitudinally extending upper table having first and second spaced ends movably coupled to said intermediate stage and arranged for linear movement in a second plane parallel to said first plane;

first and second sprocket means, said first sprocket means fixed to said frame proximate the first end of the said longitudinally extending intermediate stage and said second sprocket means fixed to said frame proximate the second end of said longitudinally extending intermediate stage; and 2N+1 chain strands coupled between said frame and said intermediate stage, one end of N+1 of said 2N+1 chain strands being connected proximate the first end of said intermediate stage and extending about said second sprocket means and one end of the remaining N of said 2N+1 chain strands being connected proximate the second end of said intermediate stage and extending about said first sprocket means, the remaining ends of said N+1 and said N chain strands being interleaved and connected together, each of said 2N+1 chain strands extending parallel to one another and to the longitudinal center-line of said longitudinally extending intermediate stage.

8. A shuttle table mechanism according to claim 7 further comprising longitudinally extending coupling means extending between said upper table and said frame.

9. A shuttle table mechanism according to claim 8 further comprising a plurality of idler means, at least one idler means coupled to said intermediate stage proximate the first end thereof and at least one idler means coupled to said intermediate stage proximate the second end thereof, wherein said longitudinally extending coupling means comprises a plurality of control chain strands, at least a first of said control chain strands being connected at one end thereof to said upper table proximate the first end thereof and extending about said second idler means, said first control chain strand being attached at the second end thereof to said frame in the area thereof adjacent to the first end of said intermediate stage, and at least a second control chain strand being connected at the first end thereof to said upper table proximate the second end thereof and extending about said first idler means, said second control chain strand being connected at the second end thereof to said frame in the area thereof adjacent to the second end of said intermediate stage.

10. A shuttle table mechanism according to claim 9 wherein said longitudinally extending intermediate stage includes a longitudinally extending center-line, said N chain strands being disposed symmetrically about said longitudinally extending center-line and said N+1 chain strands being disposed symmetrically about said longitudinally extending center-line.

11. A shuttle table mechanism according to claim 9 further comprising drive means coupled to one of said sprocket means for driving said sprocket means whereby activation of said drive means causes said linear movement of said intermediate stage and the linear movement of said upper table.

12. A shuttle table mechanism according to claim 11 wherein said N+1 chain strands and said N chain strands are connected together in a transition stage, said transition stage being formed by the interleaved overlapping of said N and N+1 chain strands and at least one pin extending transversely through each strand of said 2N+1 chain strands thereby maintaining each of said chain strands longitudinally stationary relative to one another.

13. A shuttle table mechanism according to claim 12 wherein said transition stage further comprises a plurality of spacing members, at least one spacing member positioned between each adjacent pair of interleaved overlapping adjacent chain strands.

14. A shuttle table mechanism according to claim 13 wherein said pins extend through said spacing members thereby maintaining said spacing members longitudinally fixed relative to one another and to said chain strands.

* * * * *